US006788752B1

(12) United States Patent
     Andre

(10) Patent No.: US 6,788,752 B1
(45) Date of Patent: Sep. 7, 2004

(54) MULTI-CARRIER TRANSMISSION SYSTEM

(75) Inventor: Tore Andre, Avsjo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 10/129,783

(22) PCT Filed: Nov. 17, 2000

(86) PCT No.: PCT/SE00/02264

§ 371 (c)(1),
(2), (4) Date: May 10, 2002

(87) PCT Pub. No.: WO01/37474

PCT Pub. Date: May 25, 2001

(30) Foreign Application Priority Data

Nov. 18, 1999 (SE) .............................. 9904171

(51) Int. Cl.[7] .............................................. H04B 1/10
(52) U.S. Cl. ..................................... 375/350; 375/348
(58) Field of Search ................................ 375/224, 227, 375/260, 259, 285, 346, 348, 349, 350, 229, 232, 242

(56) References Cited

U.S. PATENT DOCUMENTS

| | | | | |
|---|---|---|---|---|
| 5,185,747 | A | * | 2/1993 | Farahati ..................... 714/795 |
| 5,796,814 | A | | 8/1998 | Brajal et al. |
| 6,345,076 | B1 | * | 2/2002 | Petersen et al. ............ 375/341 |
| 6,381,291 | B1 | * | 4/2002 | Yom ........................ 375/350 |
| 6,580,761 | B2 | * | 6/2003 | Laroia et al. .............. 375/260 |
| 6,628,722 | B1 | * | 9/2003 | Laroia et al. .............. 375/259 |
| 6,693,984 | B1 | | 2/2004 | Andre |

FOREIGN PATENT DOCUMENTS

SE         506 644 C2      7/1997

OTHER PUBLICATIONS

Kim et al, "Residual ISI Cancellation for OFDM with Applications to HDTV Broadcasting", IEEE Journal on Selected Areas in Communications, vol. 16, No. 8, Oct. 1998, pp.1590–1599.

Wang et al, "Generalized Channel Impulse Response Shortening for Discrete Multitone Transceivers", Conference Record of the Twenty–third Asilomar Conference on Signals, Systems and Computers, vol. 1, Oct. 24–27, 1999, IEEE, pp. 276–280.

* cited by examiner

*Primary Examiner*—Jean B. Corrielus
(74) *Attorney, Agent, or Firm*—Nixon & Vanderhye, P.C.

(57) ABSTRACT

A method and arrangement are proposed for compensating intersymbol interference (ISI) in a multicarrier transmission system. Compensation is based on the generation of an estimate of the ISI tail and subtracting the estimate from the received signal. This is achieved by determining an estimate of the transmitted symbols at the receiver by filtering with a transfer function that approximates the inverse of the channel transfer function for the carrier frequencies used. Estimated of two consecutively transmitted symbols are used to generate a difference symbol. When a string of zeroes is appended to this difference symbol and passed through a filter, a transient results which is equivalent to that generated by the consecutively transmitted symbols passed over the channel.

24 Claims, 5 Drawing Sheets

MULTI-CARRIER TRANSMISSION SYSTEM

This application is the U.S. National phase of international application PCT/SE00/02264 filed on Nov. 17, 2000 which designates the U.S.

FIELD OF INVENTION

The invention relates to multi-carrier digital transmission systems and has particular relevance to discrete multi-tone or orthogonal frequency division multiplexed systems for use over digital subscriber lines or radio broadcast systems.

BACKGROUND ART

Digital subscriber line technologies, commonly termed xDSL enable high-speed digital data to be transmitted down an ordinary phone line. The modulation scheme utilised for asynchronous DSL (ADSL) and proposed for very high speed DSL (VDSL) is discrete multi-tone modulation DMT. In this scheme, several carriers are quadrature amplitude modulated (QAM) at the same time and added together. Modulation can be achieved by performing an inverse fast Fourier transform (IFFT), with fast Fourier transform (FFT) used for demodulation. The output from one IFFT calculation is termed a discrete multi-tone symbol and is sent over the channel after digital to analogue conversion. A problem with normal telephone lines, which often comprise a simple twisted pair, is the frequency dependent attenuation and phase shift of a transmitted signal which result in the time dispersion or spread of the signal in time. This manifests itself as interference between adjacent symbols as one symbol is spread into a following symbol. The interference in one symbol is a combination of the interference due to a previously transmitted symbol, which is correctly termed the intersymbol interference ISI and the interference due to the symbol itself, or the intercarrier interference. For the purposes of this document, no distinction will be made between the sources of the interference and the term intersymbol interference or ISI will be used to designate the total effect of interference on a symbol.

ISI can be viewed as a transient or decaying 'tail' generated at the discontinuity where consecutive symbols meet. Conventionally, the effects of ISI are mitigated by providing a guard interval in front of each symbol. The guard time typically contains a cyclic extension of the symbol. Specifically, a copy of the end of each symbol is added to the beginning of the symbol in the form of a cyclic prefix. The carriers are continuous from the beginning of the cyclic prefix to the end of the symbol. Thus any interference will be generated at the discontinuity between the start of the cyclic prefix and the end of the previous symbol. The lengths of cyclic prefixes vary according to the application, but typically consist of no more than 10% of the symbol. Longer guard intervals are unfavourable because they introduce a bandwidth penalty. If the dispersion on the channel is not too severe, the ISI transient generated at the boundary between symbols will terminate within the cyclic prefix, leaving the subsequent symbol intact. However, the impulse response of the channel, including filters in the transmitter and receiver can be very long, and often exceed the guard interval. Residual intersymbol interference will then occur which can severely impair the quality of the received signals.

In the article "Residual ISI Cancellation for OFDM with Applications to HDTV Broadcasting" D. Kim and G. Stüber, IEEE Journal on Selected areas in Communications Vol. 16, No. 8, October 1998, a technique for cancellation of residual ISI is discussed. An algorithm is proposed for removing the interference generated between consecutive symbols transmitted on a channel. This includes the interference caused by the previous transmitted symbol, i.e. the inter-symbol interference (ISI), and the disturbance due to symbol itself, i.e. the inter-carrier interference (ICI). The determination of interference requires knowledge of the transmitted symbols. This is achieved by making decisions about the transmitted symbols utilising the received, decoded symbols that have been corrupted by the channel, with knowledge of the channel response. The estimated symbols are then converted back to the time domain using IFFT and the ISI determined and removed using the algorithm. The residual symbol is then reconverted the frequency domain using FFT and the decisions made. An iterative process then follows to remove the ICI. Since the decisions on the transmitted symbols may initially be erroneous, an iterative process is necessary to accurately determine the interference. This necessarily entails a large number of calculations, so that the process as a whole demands very high processing power.

Time domain equalizers TEQ are also used in the art to mitigate the ISI of symbols transmitted over a distorting channel. A time domain equalizer is a filter, generally a finite impulse response (FIR) filter and has the effect of shortening the impulse response of the channel. This can be achieved, for example, by cancelling the poles in the channel transfer function. By using a suitable algorithm, the channel impulse response can be made shorter than the cyclic prefix utilised. However, a drawback of TEQs is that both the noise and the signal are filtered. When a TEQ cancels the poles in the channel transfer function it will also attenuate some signal frequencies and amplify noise at other frequencies. The noise will leak into the side lobes of the fast Fourier transform in the receiver and degrade performance. Hence adapting the TEQ to minimise ISI will generally result in a sub-optimal signal to noise ratio.

There is thus a need for a system which reliably mitigates the effects of intersymbol interference while leaving signal information undisturbed but is simple enough to be employed for a wide range of applications.

SUMMARY OF INVENTION

In a multi-carrier transmission system wherein digital symbols are transmitted over a transmission medium to a receiver, intersymbol interference is compensated for by generating an estimate of the ISI tail and subtracting this from the received signals. This is achieved by determining an estimate of the transmitted symbols by filtering the received symbols and then generating a transient from the estimates of two consecutively transmitted symbols. Preferably, the difference between the estimates of two consecutively transmitted symbols is formed and the resulting difference symbol used to generate the transient which replicates the transient generated between the two consecutive symbols. The transient is then subtracted from the second of the received symbols to remove interference. The filter function used to estimate the transmitted symbols is substantially an inverse of the transmission medium transfer function for the carrier frequencies used. The transient is likewise generated by filtering using a filter having a transfer function substantially the same as the transmission medium transfer function. When utilising the difference symbol to generate the transient, the difference symbol is passed through the filter followed by a string of zeros.

Obtaining estimates of the transmitted symbols by subjecting the received symbols to a simple filter function minimises the number of calculations in the tail generation process. The number of calculations is still further reduced when a single difference symbol is utilised to generate the tail in place of two symbols. The processing power required for ISI cancellation is therefore small and acceptable for substantially all applications. Furthermore, depending on the accuracy of the filters and thus the estimates, ISI removal can be complete at all carrier frequencies, thus precluding the need for a guard interval.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
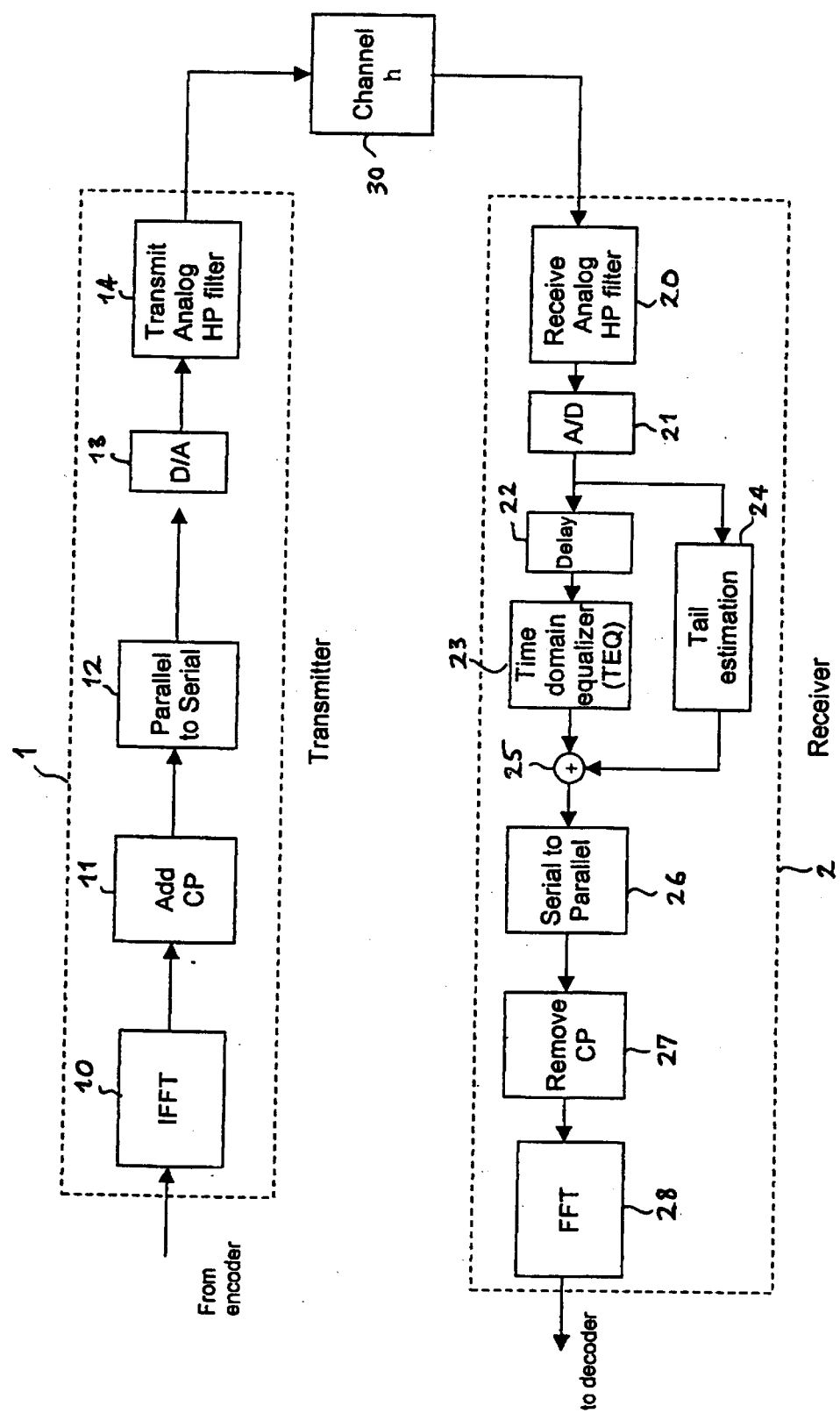
FIG. 1 schematically depicts a multi-channel transmission system including parts of transmitting and receiving portions of DMT xDSL modems modified according to the present invention.

FIG. 1 shows a block diagram representing part of an end to end link of a multi-carrier transmission system utilising discrete multi-tone modulation DMT with a transmitter 1 and receiver 2. In the present embodiment, it is assumed that the link includes at least part of a normal telephone line, which may include a twisted pair phone line. However, it will be understood that this arrangement may be used for a variety of other transmission media, including broadcast radio using orthogonal frequency division multiplexing (OFDM), for example.

The transmitter 1 and receiver 2 depicted in FIG. 1 are preferably part of modems that support Digital Subscriber Line (DSL) transmission. Preferably these modems support either ADSL (asynchronous DSL) or VDSL (Very high-speed DSL) modulation schemes, or any of the other modulation schemes which fall under the collective term xDSL. However, it will be understood from the following description that the transmitter and receiver portions illustrated may be part of devices utilised for other applications, such as high definition television (HDTV) broadcast systems.

The transmitter 1 incorporates several components including an encoder (not shown), a discrete multi-tone modulator 10, a cyclic prefix adder 11 a parallel to serial converter 12, a digital to analogue converter 13 and an analogue transmitter with high-pass filter 14. The encoder is connected upstream of the discrete multi-tone modulator 10 and serves to translate incoming bit streams into in phase, in quadrature sequences for each of a plurality of sub-channels. These encoded sequences are input to the multi-tone modulator 10, which is preferably an IFFT modulator 10 that computes the inverse fast Fourier transform by an appropriate algorithm. The discrete multi-tone encoded symbols generated in the IFFT modulator 10 are then each cyclically extended by the addition of a cyclic prefix in CP circuitry 11. This is done by duplicating a number of samples at the end of a symbol and adding these to the beginning of the symbol. The number of bits included in the cyclic prefix depends on the application and acceptable bandwidth penalty. Typically a cyclic prefix does not exceed 10% of a symbol. The parallel symbol sequences are then converted to a serial bit stream in a parallel to serial converter 12. The serial bit stream is then converted to an analogue signal with digital to analogue converter 13, prior to transmission over the link by an analogue transmitter 14, which incorporates a high-pass filter for filtering out signals in the transmitter 1 that can interfere with the POTS band. The signal is then sent over a channel 30 having a transfer function 'h' to a remote location. At the receiver 2 positioned at the remote location, an analogue receiver 20, which also incorporates a high-pass filter for filtering out noise from the POTS band, receives the signal and inputs this into an A/D converter 21 for digital conversion. The digital bit stream is then sent to the ISI compensation block consisting of delay circuitry 22, a time domain equalizer (TEQ) 23, which may be a finite impulse response (FIR) filter, tail estimation circuitry 24 and an adder 25. This block will be described in more detail below, however it should be noted that the time domain equalizer 23 is optional in this arrangement. It is useful for equalizing the received signal but is not necessary for reducing the ISI. The received symbols are then returned to parallel format in a serial to parallel converter 26. The cyclic prefix is discarded in CP removal circuitry 27 and the symbols are then demodulated in FFT circuitry 28 which performs a fast Fourier transform, and decoded by a decoder (not shown).

Figure 2A:
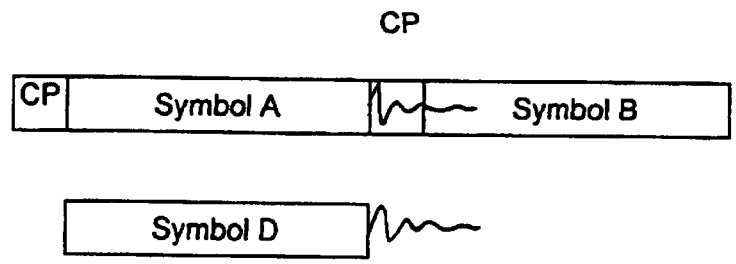
FIGS. 2a to 2b depicts symbolically the steps for generating a transient in accordance with the present invention.
Figure 2B:
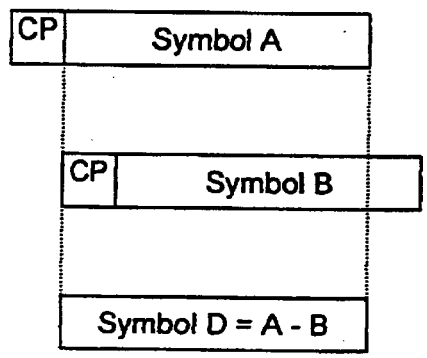
Figure 2C:
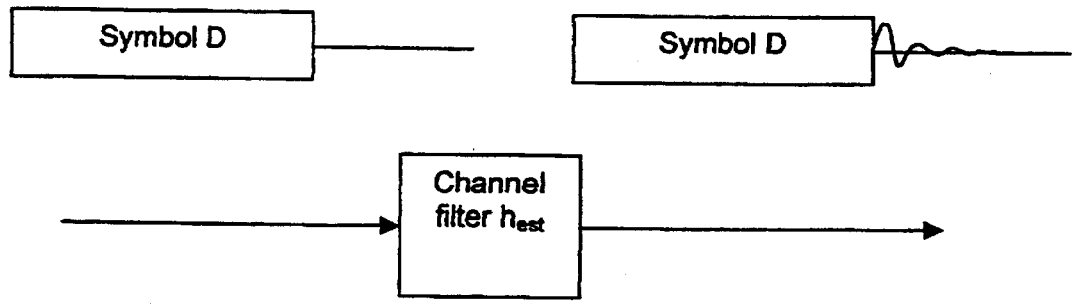
FIG. 2C detects symbolicly how the passage of a symbol through a filter generates a copy of a tail.

Turing now to FIG. 2, the ISI cancellation method according to the present invention is illustrated schematically. FIG. 2a depicts two consecutive symbols A and B which are to be transmitted down a distorting channel. The channel causes dispersion of the signals and thus interference at the overlap between the two symbols. This is illustrated here by a transient tail starting at the discontinuous carrier interface between the end of symbol A and the start of the cyclic prefix CP preceding symbol B. The tail extends beyond the cyclic prefix CP into symbol B. In accordance with the invention, it has been determined that a tail identical to that generated by consecutively transmitted symbols A and B will be generated by a symbol that is equal to the difference between symbols A and B, followed by zero. FIG. 2b illustrates how such a difference symbol D may be calculated from the two consecutive symbols A and B. It is assumed that each symbol is transmitted with a cyclic prefix, which is the duplicate of a fixed number of samples at the end of the symbol added to the beginning of the symbol. This would be added by CP circuitry 11 in the transmitter 1, for example. The cyclic prefix CP of symbol A is discarded. Symbol A is then delayed until the cyclic prefix CP of symbol B and the start of symbol B has arrived. An end of symbol B containing an equivalent number of samples to its cyclic prefix is not used for calculating the difference symbol. It will be understood that this disregarded end portion is in fact identical to the cyclic prefix, since it was used in the transmitter to form the cyclic prefix in the CP circuitry 11. This modified symbol B is subtracted from symbol A to form the difference symbol D. As shown in FIG. 2c, when symbol D, followed by zeros (indicated by the continuous line) is passed through a filter having a transfer function $h_{est}$ which is the same as that of the channel 30, an exact copy of a tail generated by consecutive symbols A and B will be generated. If this process is carried out at the receiver, the tail can be isolated and used to cancel out the ISI.

While the tail estimation has been illustrated for symbols transmitted with a cyclic prefix CP, it will be understood that a cyclic prefix may not be necessary if the estimated tail is a good estimate of the tail generated between consecutive symbols transmitted across the channel. In this case, symbol A will be delayed by one symbol delay as before but the whole of reconstructed, or estimated symbol B will then be subtracted from A.

Figure 4:
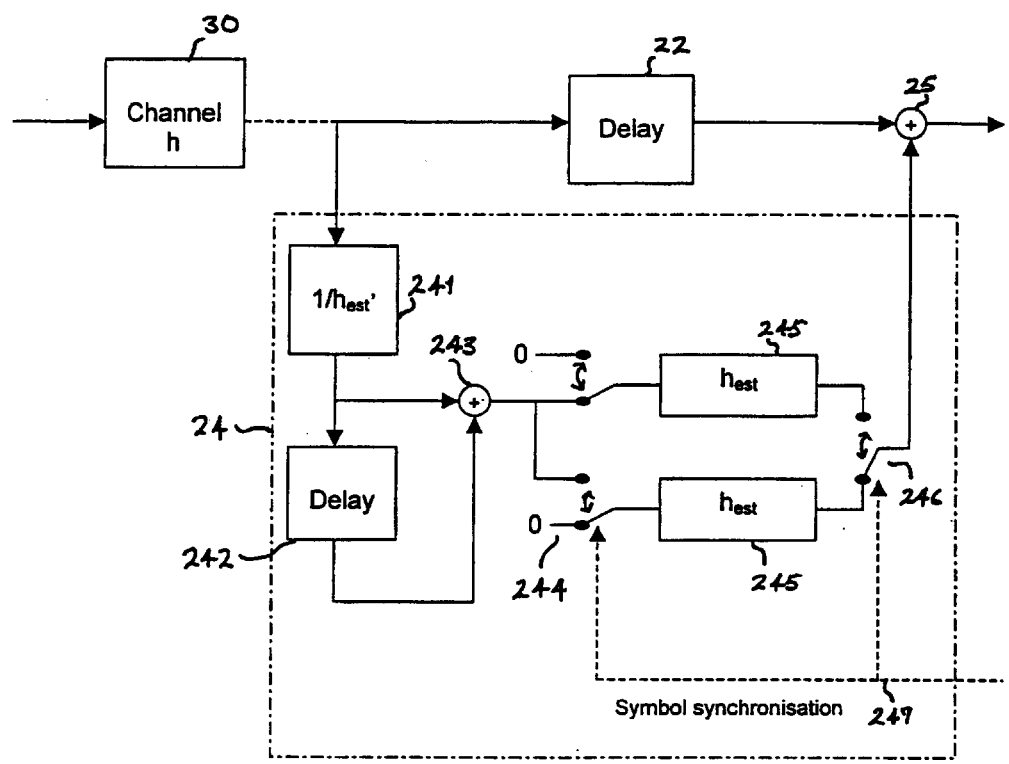
FIG. 4 depicts an arrangement for estimating and cancelling ISI at a receiver in accordance with one embodiment of the present invention.

An arrangement for performing this cancellation is shown in FIG. 4. The arrangement includes the channel 30, the delay circuitry 22, the adder circuitry 25 and a detail of the tail estimation circuitry 24 of FIG. 1. Those elements in FIG. 1 depicted between the channel 30 and the delay circuitry 22 are not shown here. The time domain equalizer circuitry 23 of FIG. 1 is also not illustrated in FIG. 4, but it will be understood that TEQ circuitry can be included between the delay 22 and adder 25 circuits.

Incoming symbols that reach the delay circuit 22 are held for a predetermined period of time to allow the corresponding transient to be generated in the tail estimation circuitry 24. Tail estimation is synchronised with the received symbol stream. When a tail has been generated, this tail is subtracted from the corresponding symbol (symbol B in FIG. 2a) in adder circuit 25.

In order to generate a tail that is substantially equivalent to that generated in the channel 30, the receiver must have knowledge of the transmitted symbols. To this end, the tail estimation circuitry 24 includes a first filter 241 having a transfer function $1/h_{est}'$ that is substantially equal to the inverse of the channel transfer function h at least for the carrier frequencies utilised. In order to obtain a filter 241 with a transfer function $1/h_{est}'$ that approximates the inverse of the transfer function h of the channel, this channel transfer function h must first be determined.

Figure 3A:
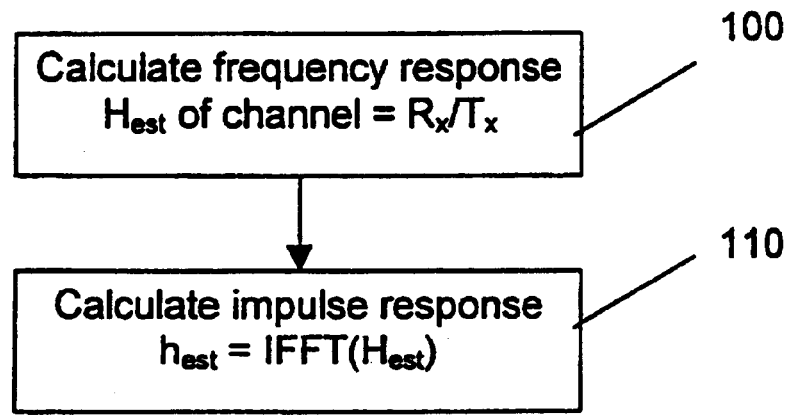
FIG. 3A is a flowchart of a method for determining a transfer function.

A number of methods exist for determining the transfer function h of any specific channel. In general a known sequence tx is employed, where t x is the sequence in the time domain and Tx is the known sequence in the frequency domain. One such method is illustrated in a flow chart in FIG. 3a. This process starts in step 100 with the determination of the channel frequency response Hest. Specifically, this step involves dividing a received signal Rx by the known transmitted signal Tx at each frequency in the frequency domain to determine the attenuation and phase shift representing the channel response in the frequency domain Hest. Conversion to the time domain to obtain the estimated channel impulse response hest is accomplished by calculating the inverse fast Fourier transform of the determined frequency response Hest.

A further method is outlined in the article "Residual ISI Cancellation for OFDM with Applications to HDTV Broadcasting" D. Kim and G. Stüber, IEEE Journal on Selected areas in Communications Vol. 16, No. 8, October 1998.

Figure 3B:
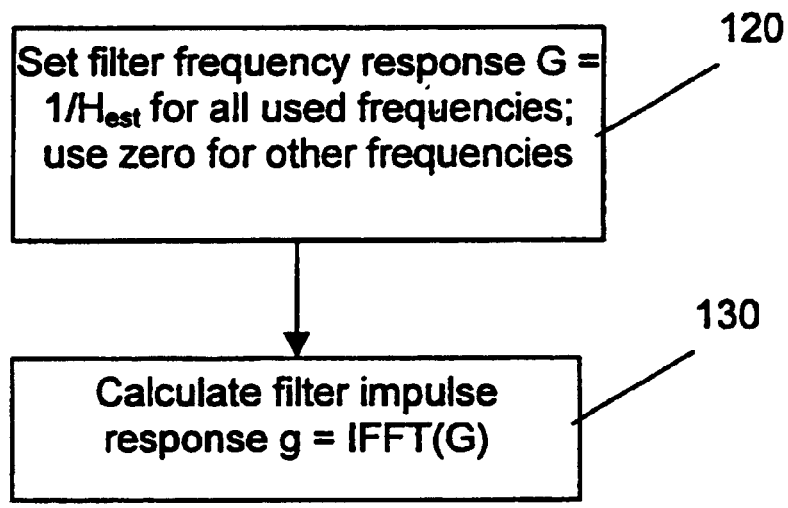
FIG. 3B is a flowchart of a method of determining an impulse response.

Normally the channel 30 is a non-minimum phase system, which means that the z-transform has zeros outside the unit circle. Naturally, this means that the inverse of such a channel will have poles outside the unit circle and consequently be unstable. However, in accordance with the present invention, the filter 241 does not need to be an exact inverse of a channel transfer function, but merely a good estimate of the inverted transfer function for the carrier frequencies utilised across the channel 30. Consequently if the channel transfer function has a null at a particular frequency, a carrier corresponding to this frequency will not be used. The flow chart in FIG. 3b illustrates a method of determining the impulse response 'g' of the filter 241 which approximates the inverse of the channel impulse response h. In the notation used previously, g' is equivalent to 1/hest', that is the inverse of the channel response h for the frequencies utilised. This method starts in step 120 wherein the frequency response G of the filter 241 is determined as the inverse of the channel frequency response for those frequencies that are utilised across the channel 30. The channel frequency response utilised in this step is the estimated frequency response Hest calculated in step 100 of the flow chart of FIG. 3a. Thus the filter frequency response G is equal to 1/Hest for the frequencies used across the channel 30. All frequencies in 1/Hest that are not used by any carrier can be set at an arbitrary value, for example zero. The filter impulse response g is then obtained in step 130 by calculating the inverse fast Fourier transform of G.

Other methods may also be utilised for determining the filter impulse response g. It will be understood that once the channel 30 transfer function $h_{est}$ has been estimated using a suitable known sequence as in steps 100 and 110 of FIG. 3a, the desired transfer function $1/h_{est}$ of the filter 241 is likewise known. The filter 241 can then be designed using standard filter optimisation approaches. If the channel transfer function is simple, the inverted transfer function can be obtained relatively easily for selected frequencies, i.e. the used carrier frequencies. One known approach that has been successfully applied to optimise the desired unknown filter 241 is minimising the mean square error. This method involves minimising the square difference between the frequency response G of the filter and the inverted frequency response of the channel $1/H_{est}$. By summing this squared difference over the frequencies used $f_i$, the error function e is obtained, where $$e = \Sigma * 1/(H_{est}(f_i)) - G(f_i))*2$$

By taking the derivative of e with respect to unknown coefficients $g_k$ and setting this equal to zero, $Me/Mg_k = 0$, a system of equations is obtained that it is possible to solve. A number of algorithms for this purpose are known.

With this method the length of the filter, i.e. the length of the filter coefficients, $g_k$, can be chosen to have a suitable value. This differs from the method described above using the inverse fast Fourier transform (steps 120 and 130 of FIG. 3), since in this case the filter will always be equal to the FFT length.

Alternatively, a filter representing an inverse of the channel may be obtained by factorising the channel into a minimum phase system and a maximum phase system. To obtain an inverse of the channel, a symbol can then be filtered through the inverse of the minimum phase system and the result subsequently filtered backwards through the reciprocal filter of the inverse of the maximum phase system. The reciprocal filter can be obtained by mirroring the poles or zeros in the unit circle.

After generating estimates of the transmitted symbols, the symbol is passed to a delay circuit 242, where it is delayed for the length of one symbol plus the cyclic prefix. Simultaneously the symbol is input into an adder circuit 243 which subtracts the symbol from the previously estimated and delayed symbol in accordance with the schematic in FIG. 2b to generate a difference symbol. The difference symbol is then input into one of two filters 245 via a corresponding switch 244. These filters 245 have a transfer function which is as close as possible to the channel transfer function. These filters can be designed using known methods as described above and will be finite impulse response (FIR) filters. As soon as the last sample of the difference symbol D has been input into a filter 245, the filter input is connected to a source of zeros by switch 244. The outputs of the filters 245 are selectively connected to an output which is coupled to adder circuitry 25 via a further switch 246. The transient is generated at the end of the difference symbol D, i.e. at the boundary between the end of the difference symbol D and the zeros which follow. Switch 246 is thus controlled to couple the filter 245 to the adder 25 at the moment when the difference symbol D has passed through the filter 245 and the transient is ready to be output. Both switches 244 and 246 are synchronised with the received symbols as shown by the dashed line 247. In the configuration illustrated in FIG. 4, each filter 245 is alternately connected to the adder 243 and to a zero source via the switch 244. Thus at any one time, one filter 245 will receive the difference symbol D from the adder 243 while the other filter 245 receives zeros. This serves to streamline the process and reduce delays. It should be noted that the filters 245 need perform calculations only when they are connected to the adder 243 via the switch 244. At all other times they are inactive and are merely being filled with data.

The filter 245 will preferably have a length, i.e. a delay, not greater than a single symbol. Thus at most a symbol length of zeros will follow the difference symbol D into the filter 245. Generally, however, the start of the symbol D will not have any significant influence on the transient. Thus, since only the transient is of interest in this circuit, the filter need not accommodate a whole symbol but may be of a length sufficient to generate the transient. This greatly reduces the complexity of the filter.

Figure 5:
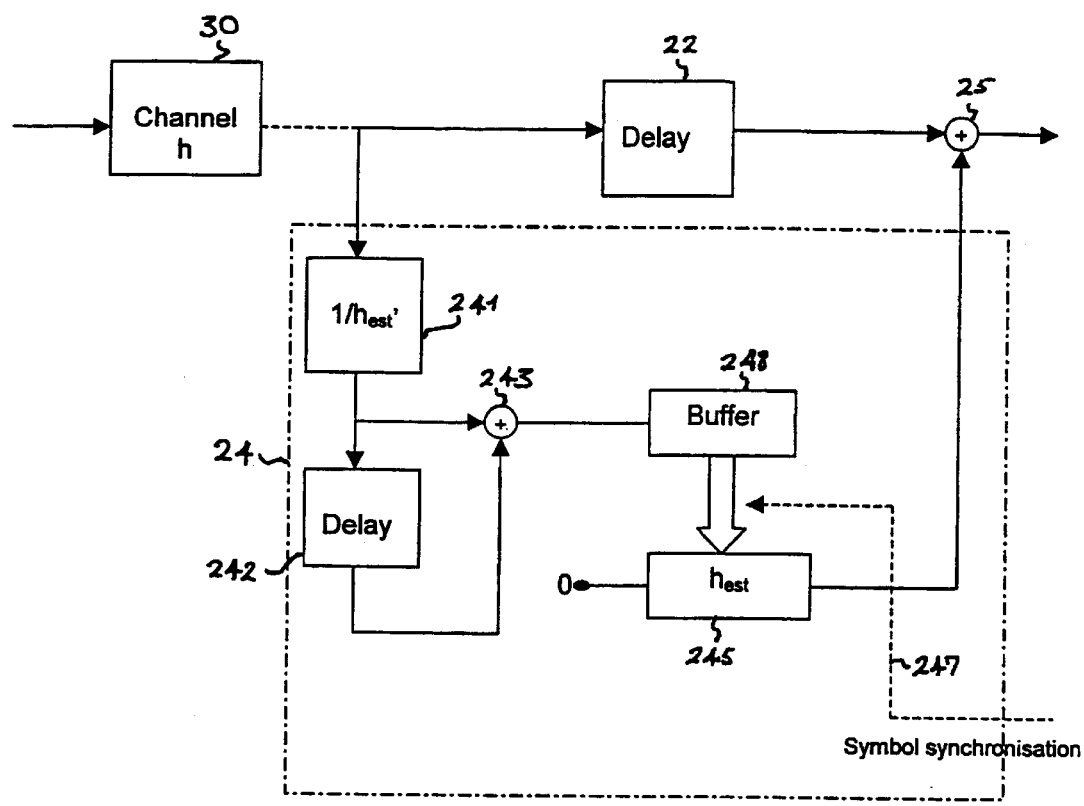
FIG. 5 depicts an arrangement for estimating and cancelling ISI at a receiver in accordance with an alternative embodiment of the present invention.

The complexity is still further reduced in an alternative embodiment according to the present invention as shown in FIG. 5. The arrangement shown in FIG. 5 is almost identical to FIG. 4 and like parts are denoted by like reference numerals. This arrangement differs from that of FIG. 4 in that only a single filter having a transfer function $h_{est}$ which is as close as possible to the transfer function of the channel 30, is utilised. A buffer 248 is provided in place of one of the filters 245 for buffering the incoming difference symbols D while the filter 245 is being filled with zeros. Furthermore, no switch is provided at the input of the filter 245. Instead the filter 245 is connected to a source of zeros. The data stored in the buffer 248 is loaded into the delay element or registers of the FIR filter 245 in synchronisation with the received symbols as indicated by the dotted line 247.

In the arrangements of FIGS. 4 and 5, the operations performed by the first filter 241, which simulates the inverse of the channel 30, and unit comprising the delay and adder circuits 242 and 243 are linear. It will thus be understood that the order of these two operations can be reversed to the same effect.

What is claimed is:

1. In a multi-carrier transmission system wherein digital symbols are transmitted over a transmission medium to a receiver, a method of compensating for intersymbol interference at the receiver comprising:

determining an estimate of each of two consecutive symbols, calculating a difference symbol from the estimates of the two consecutive symbols, generating a transient signal utilizing said difference symbol, subtracting said transient signal from a second of said two consecutive symbols to substantially cancel the intersymbol interference generated between said two consecutive symbols.

2. A method as claimed in claim 1, further comprising using a filter transfer function that is essentially equivalent to a inverse of an transmission medium transfer function at least for carrier frequencies utilized, to determine said estimate each of the two consecutive symbols.

3. A method as claimed in claim 1, further comprising subjecting said difference symbol to a filter function simulating the transfer function of said transmission medium to generate the transient signal.

4. In a multi-carrier transmission system wherein digital symbols are transmitted over a transmission medium to a receiver, a method of compensating for intersymbol interference at the receiver, the method comprising:

determining an estimate of each of two consecutive symbols by filtering the digital symbols with a transfer function that is essentially equivalent to an inverse of a transmission medium transfer function at least for carrier frequencies utilized, generating a transient signal utilizing the estimates of the two consecutive symbols, subtracting said transient signal from a second of said two consecutive symbols to substantially cancel the intersymbol interference generated between said two consecutive symbols.

5. A method as claimed in claim 4, wherein said transient signal generating step includes using a filter function simulating the transfer function of said transmission medium.

6. A method as claimed in claim 4, further comprising calculating a difference symbol from the estimates of said two consecutive symbols and subjecting said difference symbol to a filter function to generate the transient signal.

7. A method as claimed in claim 6, further comprising appending a string of zeros to the difference symbol and subjecting at least the boundary between the difference symbol and the string of zeros to the filter function.

8. A method as claimed in claim 6, wherein each transmitted symbol includes a cyclic prefix, and wherein said difference symbol calculating step includes:

discarding the cyclic prefix of the estimate of a first of the consecutive symbols, retaining the cyclic prefix of the estimate of a second of the consecutive symbols, and discarding an end of said estimate of the second symbol, the end being equal in length to the cyclic prefix, to form a modified second symbol, subtracting the modified second symbol from the estimate of the first of the two consecutive symbols to form the difference symbol.

9. In a multi-carrier transmission system wherein digital symbols including a cyclic prefix are transmitted over a transmission medium to a receiver, a method of compensating for intersymbol interference at the receiver, the method comprising:

determining an estimate of each of two consecutive symbols, calculating a difference symbol from the estimates of the two consecutive symbols by discarding the cyclic prefix of the estimate of a first of the two consecutive symbols, retaining the cyclic prefix of the estimate of a second of the two consecutive symbols, and discarding an end of said second of the two consecutive symbols, the end being equal in length to the cyclic prefix, to form a modified second symbol, subtracting the modified second symbol from the estimate of the first of the two consecutive symbols, generating a transient signal utilizing said difference symbol, subtracting said transient signal from the second of said two consecutive symbols to substantially cancel the inter-symbol interference generated between said two consecutive symbols.

10. A method as claimed in claim 9, further comprising filtering the digital symbols with a transfer function that is essentially equivalent to an inverse of a transmission medium transfer function at least for carrier frequencies utilized to determine said estimate each of the two consecutive symbols.

11. A method as claimed in claim 9, further comprising subjecting said difference symbol to a filter function that simulates the transfer function of said transmission medium to generate the transient signal.

12. An arrangement for compensating for inter-symbol interference in a receiver of a multi-carrier transmission system wherein digital symbols are transmitted over a transmission medium, the arrangement comprising:
   filter means for generating an estimate of each of two consecutive symbols,
   means for generating a transient signal from the estimates of the two consecutive symbols, and means for subtracting said transient signal from the two consecutive symbols.

13. An arrangement as claimed in claim 12, wherein said filter means includes a filter having a transfer function which approximates an inverse transfer function of said transmission medium at least for carrier frequencies of the digital symbols.

14. An arrangement as claimed in claim 12, wherein said transient signal generating means includes:
   means for calculating a difference between the estimates of said two consecutive symbols, and
   means coupled to said difference calculating means for generating said transient signal from said difference symbol.

15. An arrangement as claimed in claim 14, wherein the difference calculating means includes delay means for delaying the estimate of a first of the two consecutive symbols with respect to the estimate of a second of the two consecutive symbols.

16. An arrangement as claimed in claim 14, wherein said transient generating means further includes at least one filter having a transfer function which approximates a transfer function of said transmission medium at least for carrier frequencies of the digital symbols.

17. An arrangement as claimed in claim 16, further comprising means for coupling the difference calculating means with said at least one filter.

18. An arrangement as claimed in claim 17, wherein said coupling means includes buffering means for buffering a calculated difference symbol and for transferring said buffered difference symbol to said at least one filter.

19. An arrangement as claimed in claim 17, further comprising means for connecting an input of said at least one filter to a zero level.

20. An arrangement as claimed in claim 17, wherein said coupling means for coupling the difference calculating means with said at least one filter includes switching means for alternately coupling said at least one filter to said difference calculating means and a zero level.

21. An arrangement as claimed in claim 20, further comprising means provided at an output of the at least one filter for selectively connecting the at least one filter to the subtracting means.

22. An arrangement as claimed in claim 12, further comprising delay means for delaying a received symbol until the corresponding transient signal has been generated.

23. An arrangement for compensating for inter-symbol interference in a receiver of a multi-carrier transmission system wherein digital symbols are transmitted over a transmission medium, the arrangement comprising:
   means for generating an estimate of each of two consecutive symbols,
   means for calculating a difference between the estimates of said two consecutive symbols,
   means coupled to said difference calculating means for generating said transient signal from said difference symbol, and means for subtracting said transient signal from the two consecutive signals.

24. An arrangement as claimed in claim 23, wherein said transient generating means includes at least one filter having a transfer function which approximates the transfer function of said transmission medium.

* * * * *